US006439993B1

(12) United States Patent
O'Halloran

(10) Patent No.: US 6,439,993 B1
(45) Date of Patent: Aug. 27, 2002

(54) OPERATION OF GAMING MACHINES WITH ADDITION OF WILD CARD SYMBOLS

(75) Inventor: Terence Matthew O'Halloran, Edgecliff (AU)

(73) Assignee: I.G.T. (Australia) Pty Limited, New South Wales (AU)

( * ) Notice: Subject to any disclaimer, the term of this patent is extended or adjusted under 35 U.S.C. 154(b) by 0 days.

(21) Appl. No.: 09/496,240

(22) Filed: Feb. 1, 2000

(30) Foreign Application Priority Data

Feb. 1, 1999 (AU) ............................................. PP8423

(51) Int. Cl.[7] .......................... A63F 13/10; A63B 71/00
(52) U.S. Cl. ........................ 463/16; 463/20; 273/143 R
(58) Field of Search ......................... 463/16–21, 11–13; 272/292–293, 138.1; 273/143 R

(56) References Cited

U.S. PATENT DOCUMENTS 4,836,546 A * 6/1989 DiRe et al. ............. 273/138 A
5,308,065 A * 5/1994 Bridgeman et al. ........... 273/85
5,332,228 A * 7/1994 Schultz ....................... 273/292
5,373,440 A * 12/1994 Cohen et al. ............... 364/410
5,449,173 A * 9/1995 Thomas et al. ......... 273/143 R
5,647,798 A * 7/1997 Falciglia ...................... 463/19
5,704,835 A * 1/1998 Dietz, II ...................... 463/20
5,816,916 A * 10/1998 Moody ........................ 463/13
5,823,873 A * 10/1998 Moody ........................ 463/13
5,823,874 A * 10/1998 Adams ........................ 463/17
5,947,821 A * 9/1999 Stone .......................... 463/13
6,059,289 A * 5/2000 Vancura .................. 273/143 R
6,089,977 A * 7/2000 Bennett ....................... 463/20
6,120,031 A * 9/2000 Adams ....................... 273/292
6,120,378 A * 9/2000 Moody et al. ................ 463/20
6,126,542 A * 10/2000 Fier ............................ 463/16

* cited by examiner

*Primary Examiner*—Mark Sager
*Assistant Examiner*—Steven Ashburn
(74) *Attorney, Agent, or Firm*—George H. Gerstman; Seyfarth Shaw

(57) ABSTRACT

A method and apparatus concerning the operation of gaming machines is provided. The method generally comprises providing a gaming machine having a plurality of simulated spinning reels capable of displaying a wild card symbol at any of the reels. According to the present invention, upon the appearance of a first wild card symbol, additional wild card symbols may appear, providing the player with additional opportunities to win a prize, or to win an additional prize. The apparatus of the present invention is directed to a gaming machine capable of displaying simulated spinning reels having a plurality of symbols, and capable of displaying a wild card symbol. If a first wild card symbol has been displayed, the apparatus then displays an additional one or more wild card symbols, providing the player with an additional opportunity to win a prize, or to win an additional prize. The present invention is particularly well-suited to increasing player interest in a gaming machine by increasing the ways in which playing the game may result in the award of a prize.

25 Claims, 4 Drawing Sheets

OPERATION OF GAMING MACHINES WITH ADDITION OF WILD CARD SYMBOLS

BACKGROUND INFORMATION

Video gaming machines also are commonly known as slot, poker or fruit machines, and provide a player with a game of chance. As is well known, in basic spinning reel slot machines the player selects the number of win lines and the number of credits to be wagered per win line per play, then sets the reels spinning by activating a play pushbutton. The reels are rotated for a certain time period then stopped at predetermined locations. If a combination of symbols on any of the win lines matches a predetermined winning combination of symbols, credits are won and can be redeemed as coins or in some other convenient form.

One of the most popular known variations is the use of a wild card, which serves as a substitute for any other symbol, and provides an extra degree of volatility to the basic game.

A problem with known gambling machines is that they lack variety and players lose interest, in particular, after repeated plays.

SUMMARY OF THE INVENTION

It is an object of the present invention to provide a method and apparatus for the operation of gaming machines that will provide to a player greater enjoyment and excitement in play of the machines, which, in turn, provides commercially useful effects for the suppliers of the machines and operators of licensed premises.

In accordance with one aspect of the present invention there is disclosed a gaming machine including: a video display upon which a plurality of simulated spinning reels are displayed, each reel having a plurality of symbols, and at least one win line being formed by a horizontal alignment of symbols on adjacent reels, and the gaming machine being under the control of processor means such that following the play of a spinning reel game a wild card symbol can appear in one of the reels on a win line, and one or more further wild card symbols are caused to substitute in one or more other reels, and a prize is awarded for combinations of the wild card symbols and one or more of the other symbols occurring on the win line.

The invention further discloses a method for operation of a gaming machine generally as defined above in relation to operation of the processor means.

It is preferred that there are three win lines. Further, the wild cards can be caused to substitute on adjacent reels so as to be contiguous on a win line. In one embodiment there can be five reels, meaning the number of wild cards will be an original (or triggering) one, and one to four further (or expanding) ones. That is, the wild cards can substitute for every original/other symbol on a win line.

Such a methodology is commercially advantageous in that there will be increased interest by players of gaming machines promoting enjoyment for them, increased sales of machines by vendors and increased revenues for operators of licensed premises and taxing authorities such as Governments. In many licensed premises in Australia and the United States, it is almost always the case that there will be a number of gaming machines provided by different vendors, and it is a particular motivation of vendors for their gaming machines to be played over others'. This is relevant to both the income derived from the lease of the machines to the licensed premises and in seeking to ensure ongoing business with the licensed premises. It is thus a very real motivation for vendors to provide new and commercially useful game functions to attract players to their particular machines within any given licensed premises.

Practice of the invention also has the advantage that, on occurrence of a trigger wild card symbol, a prize will be awarded for at least "three of a kind".

DETAILED DESCRIPTION

Embodiments of the present invention will now be described with reference to the accompanying drawings.

Because slot machines are well known in the art, the present description will be directed in particular to the elements forming part of the present invention and therefore elements not specifically shown or described herein will be readily appreciated by those skilled in the art. In particular, it will be appreciated that the gaming machine operation can be implemented by appropriate programming of known gaming machines, such as the GAME KING™ machine available from the assignee of the present invention.

Figure 1:
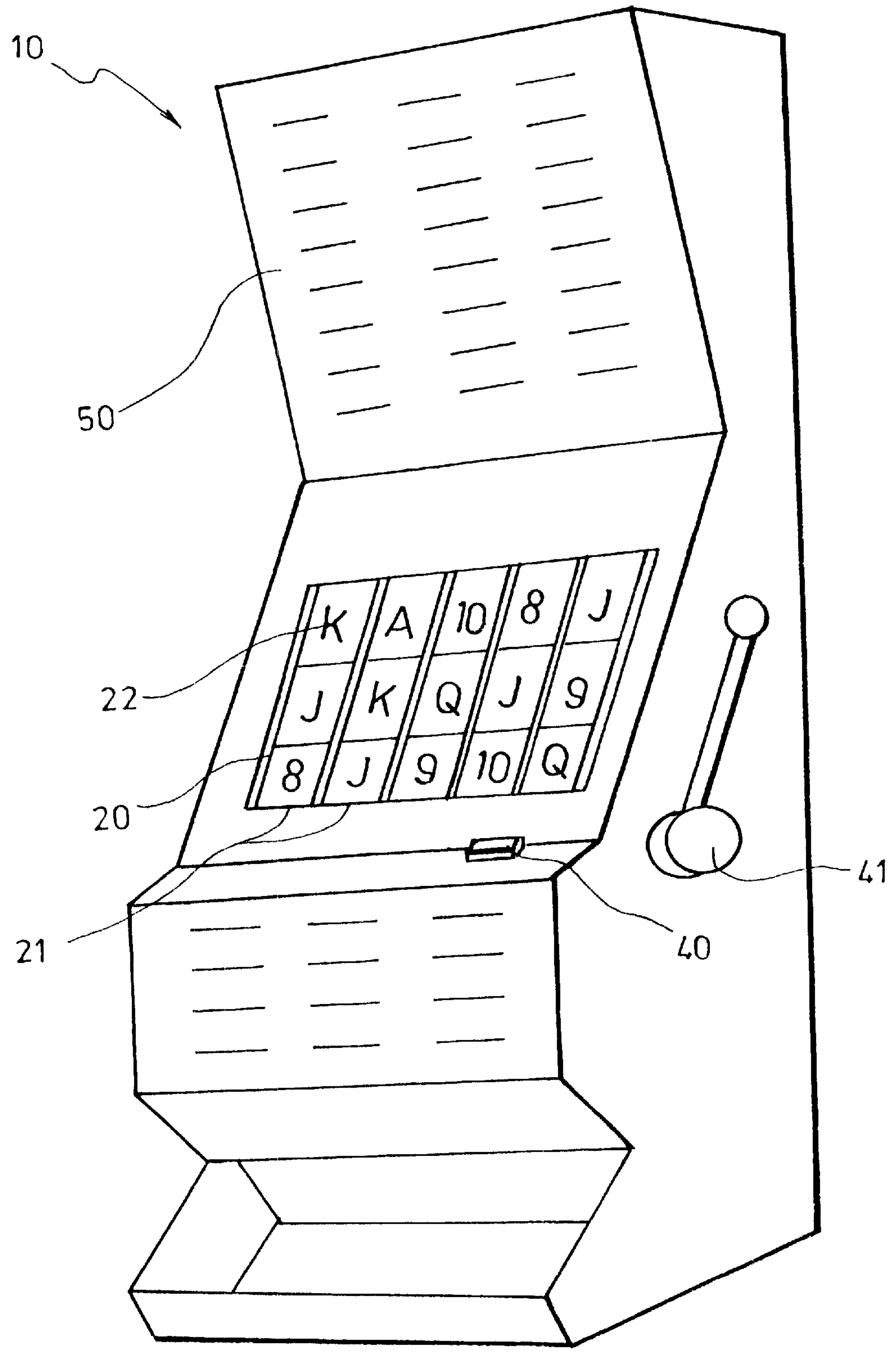
FIG. 1 shows the basic layout of a slot machine with a video display simulating rotating reels.

FIG. 1 shows a typical gaming machine 10, which includes a CRT screen 20 upon which a plurality of simulated rotatable reels 21 are displayed. Each reel has a number of symbols 22 displayed on it. The present embodiment has 5 reels with 3 symbols per reel displayed. An artwork panel 50, located above the screen 20, displays the various winning combinations for which a prize is won. The play of a game is started by pressing a pushbutton 40 or pulling a lever 41. For reasons of clarity other pushbuttons, such as the number of "win lines" to be selected and "units per line", have been omitted from the figure.

Figure 2:
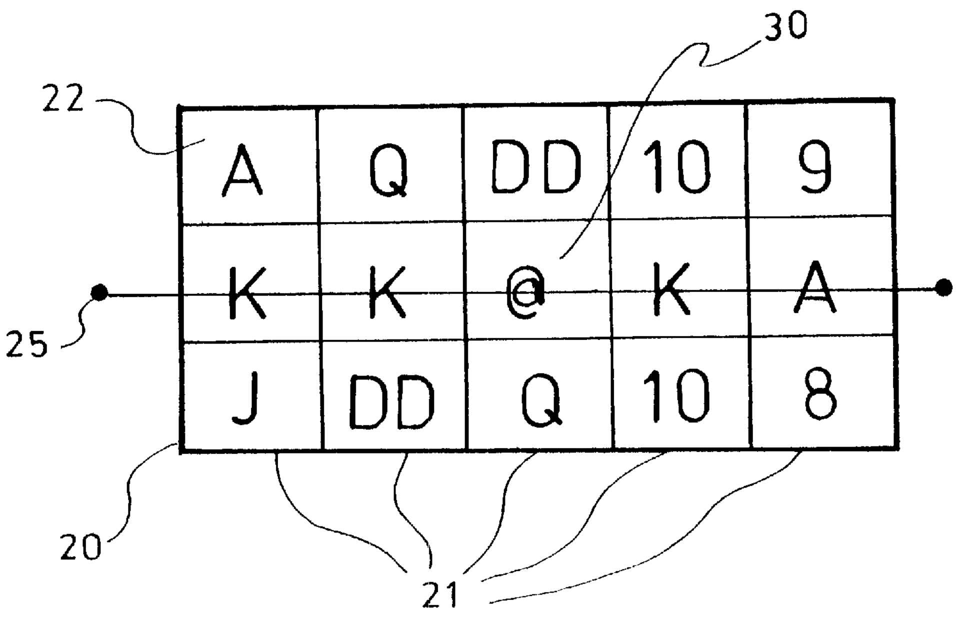
FIG. 2 shows the video display layout with a trigger wild card appearing.

On the CRT screen 20, the simulated reels 21 rotate for a certain time period before they are caused to stop at selected positions. A certain combination of symbols 22 would appear on the screen 20. FIG. 2 shows the screen 20 after such a rotation. When the combination of symbols 22 on the "win line" 25 matches a predetermined winning combination of symbols a prize may be awarded in the form of credits. More than one winning line 25 can be defined and selected by the player, but the description of this first embodiment will be limited to one winning line only.

The symbols 22 can include a trigger wild card symbol 30, in this case the "@" symbol. A wild card symbol 30 is a symbol that can be substituted with any other symbol 22 to produce a prize winning combination. In the example of FIG. 2, the prize for "Four Kings" would be awarded. This is the conventional arrangement.

Figure 3:
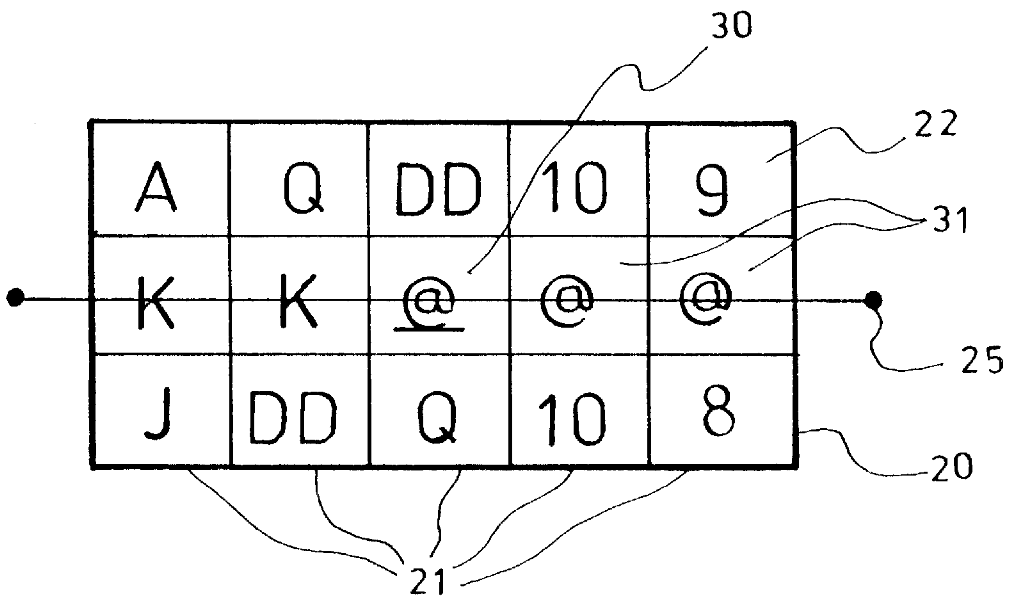
FIG. 3 shows the video display layout with further wild cards appearing.

With reference now to FIG. 3, according to an embodiment of the present invention, upon the display of a first or trigger wild card symbol 30 at any reel position on the win line 25, at least one further wild card symbol 31 substitutes for at least one of the original symbols 22. The additional wild card symbol or symbols 31, like the trigger wild card symbol 30, can be substituted with any other symbol 22 to produce a winning combination. Therefore, the provision of further wild card symbols 31 provides the player with an additional opportunity to win a prize, or to win an additional prize, as described more fully below. The appearance of the first trigger wild card symbol 30 is identical that of the "expanded" wild card symbols 31, however, it will be illustrated differently for description purposes by way of underlining. The wild card symbol "@" would appear in the same line on the reel or reels that are adjacent to the trigger wild card symbol.

According to another embodiment of the present invention, upon display of a first wild card symbol 30 at any position on the win line 25, additional wild card symbols 31 may or may not substitute for the original symbols 22. The determination of whether any of the original symbols 22 are replaced by additional wild card symbols 31 may be random or pseudo-random, thereby adding a further element of chance to the game.

The prize, being awarded for a prize winning combination on a winning line 25, can be calculated in either of two different ways. In the first, the winning combination or combinations is assessed only after the substitution of wild card symbols 31. In the example in FIG. 3, this will result in a pay-out for "Five Kings". In the second way, the prize winning combinations are assessed after the rotation with only the trigger wild card symbol 30 appearing, and again after the substitution with both the trigger wild card 30 and the further wild cards 31 appearing on the screen 20, the total prize being the sum of the two. In the example in FIGS. 2 and 3, the prize would be the sum of the prizes for "Four Kings" (from FIG. 2) and "Five Kings" (from FIG. 3).

Figures 4A, 4B, 4C, 4D, 4E, 4F:
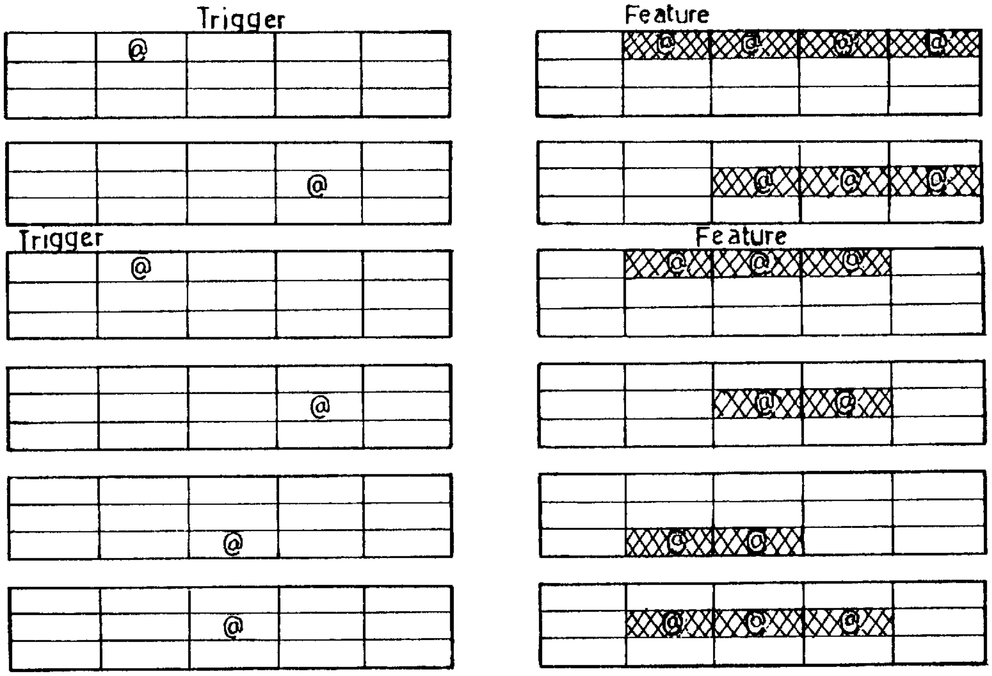
FIGS. 4*a–f* and 5*a–z* how different combinations of trigger wild card symbols and their expanded wild card symbols.

FIGS. 4*a*–4*f* show a number of example arrangements by which a trigger symbol can appear in specific reels on different ones of three horizontal win lines, and that the number of expanded or further wild card symbols can be one or more (e.g., three in FIG. 4*a*, two in FIG. 4*b*, and so on). Of course, combinations in addition to those illustrated in FIGS. 4*a*–4*b* are possible.

Figures 5A, 5B, 5C, 5D, 5E, 5F, 5G, 5H, 5I, 5J, 5K, 5L, 5M, 5N, 5O, 5P, 5Q, 5R, 5S, 5T, 5U, 5V, 5W, 5X, 5Y, 5Z:
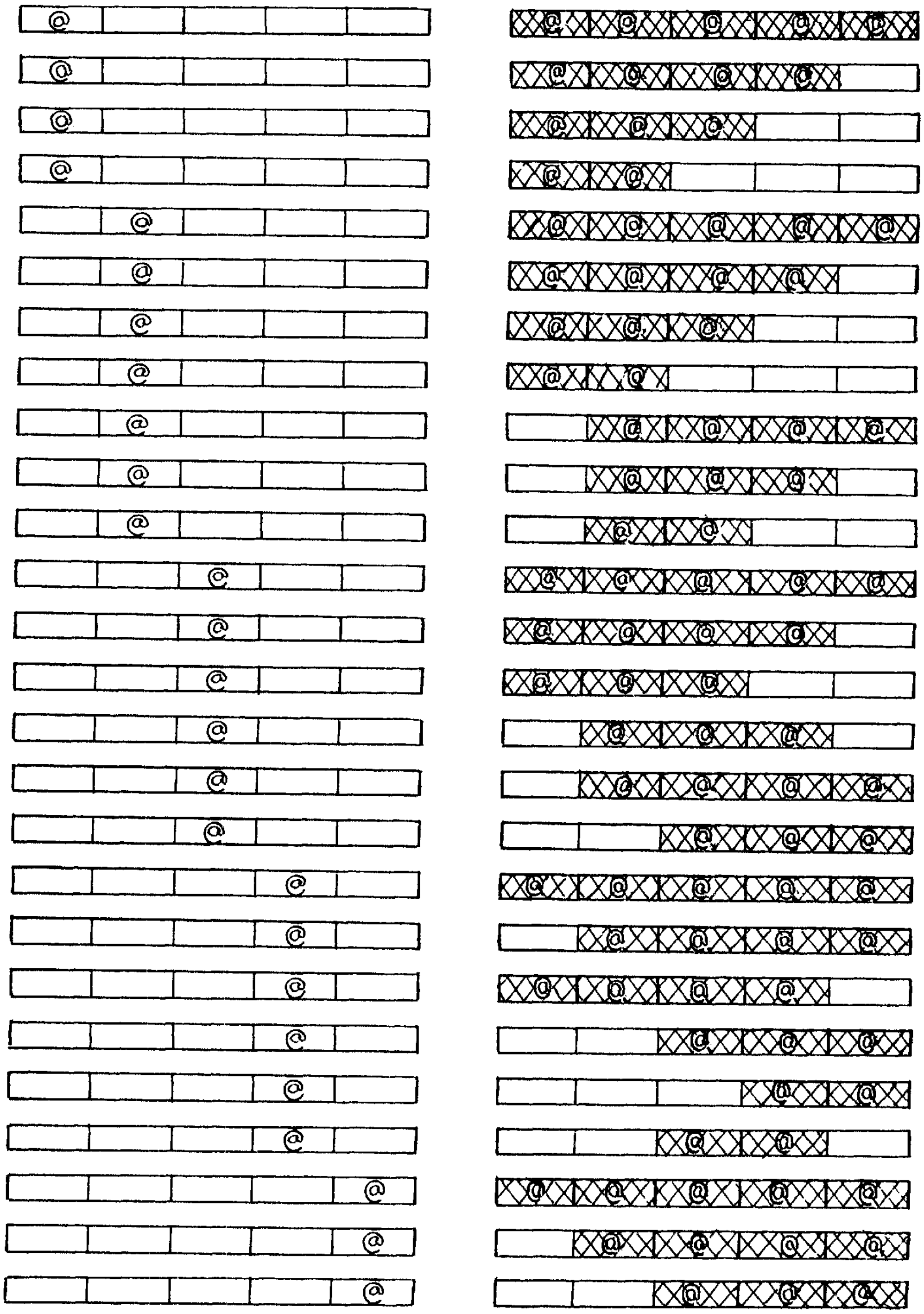

FIGS. 5*a*–5*z* show further combinations of the total number of wild card symbols for various trigger symbols on ones of five reels (adopting a generic single win line), that in particular illustrates that the number of expanding wild card symbols can be in the range 1 to n−1 where n is the number of reels. Combinations in addition to those illustrated in FIGS. 5*a*–5*z* are also possible and are contemplated by the present invention.

The foregoing describes only one embodiment of the present invention, and modifications, obvious to those skilled in the art can be made thereto without departing from the scope of the present invention.

The present invention, and various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, in terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention is included, description of one or more embodiments in certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable, and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of operating a gaming machine, comprising:

providing a gaming machine which includes:

a processor for executing said gaming procedure: and a display, coupled to said processor;

displaying a plurality of simulated reels on said display, each reel having a plurality of symbols, wherein said plurality of symbols include a wild card symbol;

spinning said simulated reels;

stopping the spinning of said simulated reels to display a predetermined number of symbols on each reel, wherein one of said plurality from each of said plurality of simulated reels combine to form at least a first win line after said reels have stopped; and in response to a first wild card symbol being displayed in said first win line, altering at least some of the symbols displayed by displaying at least one additional wild card symbol in said first win line.

2. The method of claim 1, five simulated reels are displayed.

3. The method of claim 2, wherein in response to a first wild card symbol being displayed, from one to four additional wild card symbols are displayed as the result of a random or pseudo random selection process.

4. The method of claim 1, wherein said predetermined number of displayed symbols on each simulated reel form three win lines.

5. The method of claim 1, further comprising:

awarding a prize based on said at least a first win line after said displayed symbols are altered.

6. The method of claim 1, further comprising:

determining a first prize amount based on said symbols appearing in said at least a first win line before said step of altering;

determining a second prize amount based on said symbols appearing in said at least a first win line after said displayed symbols are altered; and awarding a prize equal to the sum of said first prize amount and said second prize amount.

7. The method of claim 1, wherein said displayed symbols are altered by displaying at least one additional wild card symbol in a reel adjacent to said first wild card symbol and in the same line as said first wild card symbol.

8. The method of claim 1, wherein said additional wild card symbols are contiguous with respect to one another and with respect to said first wild card symbol.

9. A gaming machine, comprising:

a processor for executing a gaming procedure;

a video display controlled by said processor, upon which a plurality of simulated spinning reels are displayed, each reel having a plurality of symbols, wherein displayed symbols from each of said simulated reels form at least one win line, and wherein upon the appearance of a first wild card symbol in at least one win line as part of at least one simulated reel, one or more further wild card symbols are caused to substitute in one or more other reels, and wherein a prize is awarded in response to predetermined combinations of the wild card symbols and one or more of the other symbols displayed on said at least one win line.

10. The gaming machine of claim 9, wherein there are three win lines.

11. The gaming machine of claim 9, wherein said further wild card symbols are caused to substitute on adjacent reels, so as to be contiguous on a win line.

12. The gaming machine of claim 9, wherein there are five simulated reels.

13. A method for expanding a win line of a gaming machine, comprising:

providing a gaming machine having a display;

displaying a plurality of gaming symbols;

altering the displayed gaming symbols in response to a request to initiate game play to form an initial game result, wherein said displayed gaming symbols form at least one win line; and in response to a first wild card symbol being displayed in said at least one win line of said initial game result, expanding said line of displayed symbols by substituting at least one symbol in said at least one win line and adjacent to said first wild card symbol with a second wild card symbol to form an expanded game result.

14. The method of claim 13, further comprising awarding a prize based on said expande game result.

15. The method of claim 13, further comprising awarding a prize based on a combination of said initial game result and said expanded game result.

16. The method of claim 13, wherein said displayed gaming symbols form three win lines.

17. The method of claim 13, wherein at least one win line comprises n symbols where a plurality of simulated reels are provided in said display, the symbols forming the expamded game results being selected by a random or pseudo random process, and n is the number of said reels in said display.

18. The method of claim 17, wherein said step of expanding said line of displayed symbols comprises substituting from 1 to n−1 symbols in said at least one win line with a second wild card symbol.

19. The method of claim 13, wherein said first wild card symbol is identical to said second wild card symbol.

20. An expanded line gaming machine, comprising:

gaming machine means;

visual display means for displaying a plurality of gaming symbols;

user input means for initiating play, wherein said plurality of gaming symbols are altered in response to a signal to initiate game play to form at least a first win line, wherein at least one displayed symbol is substituted in said first win line with a second wild card symbol, in response to a first wild card symbol being displayed in said first win line to form an expanded win line, and wherein a prize is determined based upon at least one of said first win line and said expanded win line.

21. The gaming machine of claim 20, wherein said plurality of gaming symbols are altered to form three win lines.

22. The gaming machine of claim 20 wherein said visual display has a plurality of simulated reels, and from 1 to n−1 symbols are substituted with from 1 to n−1 wild card symbols, where n is the number of simulated reels in said visual display.

23. The gaming machine of claim 20, wherein said first wild card symbol is identical to said second wild card symbol.

24. The gaming machine of claim 20, wherein the prize is determined based at least partly upon said expanded win line.

25. The method of operating a gaming machine, comprising;

providing a gaming machine which includes:

a processor for executing said gaming procedure; and a display, coupled to said processor;

displaying a plurality of simulated reels on said display, each reel having a plurality of symbols, wherein said plurality of symbols include a wild card symbol;

spinning said simulated reels;

stopping the spinning of said simulated reels to display a pre-determined number of symbols on each reel, wherein one of said plurality of symbols from each of said plurality of simulated reels combine to form at least a first win line after said reels have stopped, wherein n simulated reels are displayed; and in response to a first wild card symbol being displayed, altering at least some of the symbols displayed by displaying from 1 to n−1 additional wild card symbols in accordance with a random or pseudorandom selection process, such that said additional wild card symbols appear in adjacent reels.

* * * * *

UNITED STATES PATENT AND TRADEMARK OFFICE

CERTIFICATE OF CORRECTION

PATENT NO. : 6,439,993 B1
DATED : November 7, 2002
INVENTOR(S) : O'Halloran

It is certified that error appears in the above-identified patent and that said Letters Patent is hereby corrected as shown below:

Column 1,
Line 3, above "BACKGROUND INFORMATION" please insert as a separate paragraph: -- This invention relates to gaming machines, and particularly to a video, spinning reel type of gaming machine. --

Column 5,
Line 35, cancel "expande" and insert -- expanded --.
Line 43, cancel "expamded" and insert -- expanded --.

Signed and Sealed this

Eleventh Day of February, 2003

JAMES E. ROGAN
*Director of the United States Patent and Trademark Office*